(No Model.) 2 Sheets—Sheet 1.
C. B. GARRISON & S. & J. G. CALHOUN.
ROAD CART.
No. 455,198. Patented June 30, 1891.
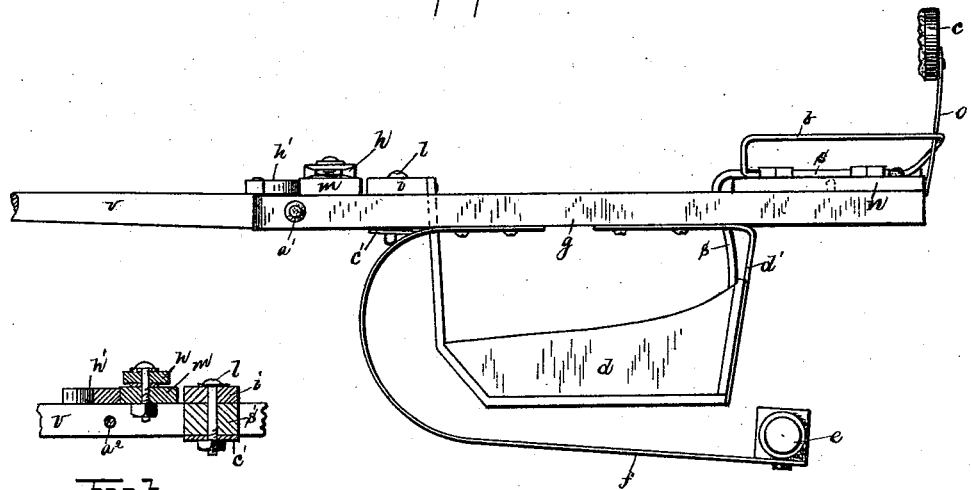
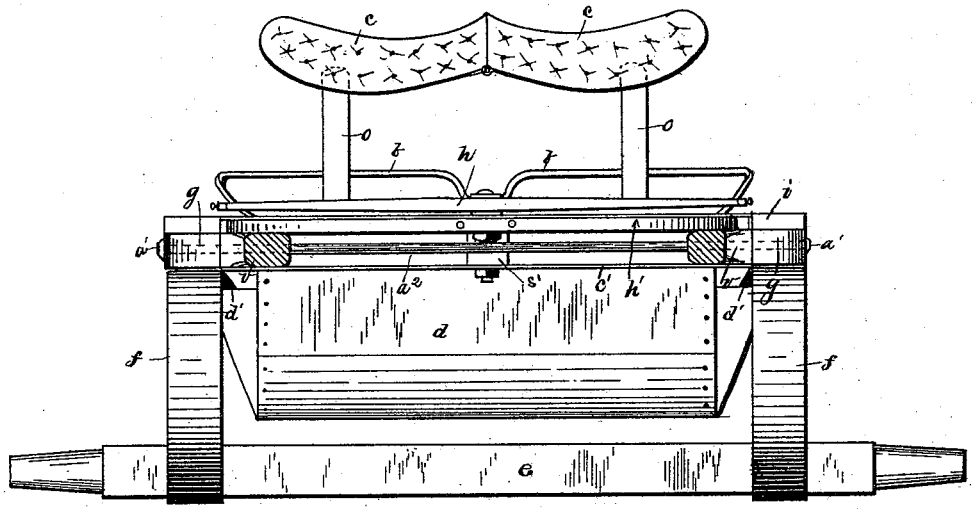
Witnesses.
P. S. Lowrie.
Ida E. Dickinson.
Inventors.
Calvin B. Garrison
Samuel Calhoun
James G. Calhoun
by Bradford Howland
Attorney.

(No Model.) 2 Sheets—Sheet 2.
C. B. GARRISON & S. & J. G. CALHOUN.
ROAD CART.

No. 455,198. Patented June 30, 1891.

UNITED STATES PATENT OFFICE.

CALVIN B. GARRISON, OF CHARLESTOWN, AND SAMUEL CALHOUN AND JAMES G. CALHOUN, OF EDINBURG, OHIO.

ROAD-CART.

SPECIFICATION forming part of Letters Patent No. 455,198, dated June 30, 1891.

Application filed October 6, 1890. Serial No. 367,246. (No model.)

*To all whom it may concern:*

Be it known that we, CALVIN B. GARRISON, of Charlestown, Portage county, Ohio, and SAMUEL CALHOUN and JAMES G. CALHOUN, of Edinburg, Portage county, Ohio, citizens of the United States, have invented a new and useful Improvement in Road-Carts, of which the following is a specification.

Figure 4:
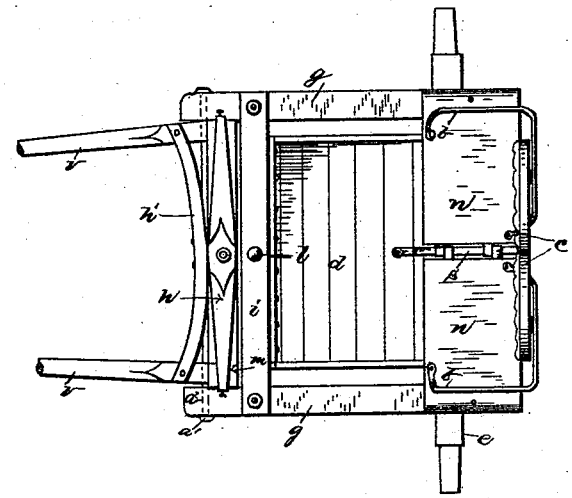
Figure 5:
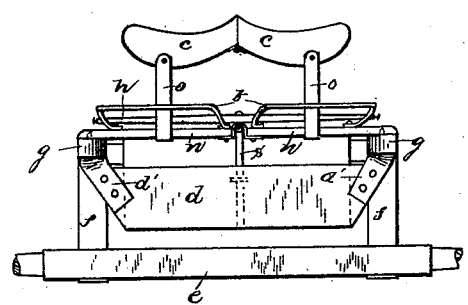
Figure 6:
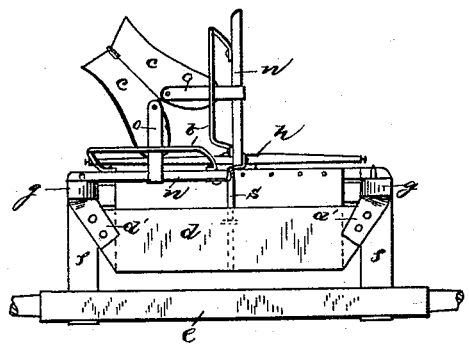

In the drawings hereto annexed and forming a part hereof, Figure 1 is a side elevation of the road-cart with the wheels removed. Fig. 2 is a front view of the same with the thills in section. Fig. 3 is a detail view. Fig. 4 is a plan of the road-cart, and Figs. 5 and 6 are rear views of the same.

Our invention relates to the hinged seat, the U-shaped springs, and the adjustable thills.

The rear end of the lower part of the body $d$ of the cart is attached by metal straps $d'\ d'$ to the side bars $g\ g$, and the front end of the same is attached to cross-bar $i$. The U-shaped springs $f\ f$, having their open ends to the rear, are attached at their upper ends to the under sides of bars $g\ g$ and at their lower ends to axle $e$. These springs entirely support the body of the cart and in such a manner that when the cart is suddenly started, or when the wheels meet with an obstacle, the springs yield in a forward direction, and thereby prevent to a great extent a sharp jerk to the body of the cart.

The seat $n\ n$ is hinged across its center to rod $s$, whose lower end is firmly attached to the part $d$ of the body of the cart. The back of the seat is in two parts $c\ c$, hinged together and supported by bars $o\ o$, which are pivoted at their upper ends to the seat-back and rigidly attached at their lower ends to seat $n\ n$. One part $n$ of the seat and the back $c\ c$ will turn on their respective hinges to the position shown in Fig. 6 on lifting the outer end of of part $n$, and thereby enable a person to enter the cart at its rear end without climbing over the seat. Either part $n$ may be thus lifted for the same purpose.

Each part $n$ of the seat is provided with an ordinary seat-rail $b$, which forms a support or brace for bars $o\ o$.

The thills $v\ v$ are pivoted on rod $a^2$ to render them adjustable to the height of the horse without tilting the seat. The ends $a'\ a'$ of rod $a^2$ extend through side bars $g\ g$.

The thills are retained in their relative positions to each other by cross-bars $h'\ m$. Spring $c'$ is attached to the under side of the thills at their ends and beneath bar $i$. Bolt $l$ extends through bar $i$, block $s'$, and spring $c'$.

By making block $s'$ of greater or less thickness the angle or inclination of the thills to bars $g$ and the seat is adjusted to the height suitable for the horse drawing the cart without tilting the seat.

The whiffletree $h$ is pivoted to cross-bar $m$.

It is not essential, but we deem it preferable, that cross-bar $c'$ should be a spring, as its elasticity permits a degree of vertical movement to the thills without disturbing the seat from its horizontal position.

Block $s'$ may be dispensed with by using any well-known form of bolt $l$ capable of adjusting the distance between bar $i$ and the thills.

We claim as our invention—

1. In a road-cart, U-shaped springs arranged lengthwise of the cart with their open ends toward the rear and attached to the axle and body of the cart and supporting the latter and the thills, substantially as described.

2. A vehicle-seat and its back centrally hinged and the latter being pivoted to its supports, and both of its sections adapted to turn in the same plane on the connecting-hinges at their ends, substantially as described.

3. A road-cart seat and its back in two sections, both the seat and its back being hinged at the connecting ends of said sections and each section being adapted to turn on the other in a vertical plane with the same, substantially as described.

CALVIN B. GARRISON.
SAMUEL CALHOUN.
JAMES G. CALHOUN.

Witnesses:
IDA E. DICKINSON,
BRADFORD HOWLAND.